United States Patent
Chen et al.

(10) Patent No.: US 6,973,712 B2
(45) Date of Patent: Dec. 13, 2005

(54) LEAD PLATING METHOD FOR GMR HEAD MANUFACTURE

(75) Inventors: Chao-Peng Chen, Fremont, CA (US); Kevin Lin, San Ramon, CA (US); Jei-Wei Chang, Cupertino, CA (US); Kochan Ju, Fremont, CA (US); Hui-Chuan Wang, Pleasanton, CA (US)

(73) Assignee: Headway Technologies, Inc., Milpitas, CA (US)

( * ) Notice: Subject to any disclaimer, the term of this patent is extended or adjusted under 35 U.S.C. 154(b) by 631 days.

(21) Appl. No.: 10/093,106

(22) Filed: Mar. 7, 2002

(65) Prior Publication Data

US 2003/0167626 A1    Sep. 11, 2003

(51) Int. Cl.[7] .......................... G11B 5/127; H04R 31/00
(52) U.S. Cl. ............................. 29/603.14; 29/603.07; 29/603.15; 29/603.16; 29/603.18; 205/119; 205/122; 360/234.1; 360/324.11; 360/324.12; 360/324.2; 427/127; 427/128; 438/369; 438/396; 438/706; 438/720; 438/722; 451/5; 451/41
(58) Field of Search ........... 29/603.07, 603.14–603.16, 29/603.18; 205/119, 122; 360/324.1, 324, 360/324.12, 324.11, 324.2; 427/127, 128; 438/369, 396, 706, 720, 722; 451/5, 41

(56) References Cited

U.S. PATENT DOCUMENTS

| | | | |
|---|---|---|---|
| 5,761,013 A | 6/1998 | Lee et al. | 360/126 |
| 5,907,459 A | 5/1999 | Shouji et al. | 360/113 |
| 6,118,621 A | 9/2000 | Ohsawa et al. | 360/113 |
| 6,185,078 B1 * | 2/2001 | Lin et al. | 360/324.12 |
| 6,188,549 B1 | 2/2001 | Wiitala | 360/320 |
| 6,262,869 B1 * | 7/2001 | Lin et al. | 360/324.11 |
| 6,350,487 B1 * | 2/2002 | Hasegawa et al. | 427/128 |
| 6,407,004 B1 * | 6/2002 | Kimura et al. | 438/720 |

FOREIGN PATENT DOCUMENTS

JP      07062592 A   *   3/1995   ............ C25D 5/48

OTHER PUBLICATIONS

"Effects of magnetic shield anneal processes determined by MFM and domain imaging"; Doherty, D.; O'Donnell, D.; Johnston, A.; Magnetics Conference, 2002. INTERMAG Europe Apr. 28, 2002-May 2, 2002 Page(s):BP3.*
Nakamoto et al.,"Read-Write Performance of GMR Heads with Lead Overlaid Structure," 2000 IEEE.
Tamak et al., "Design and Fabrication for Sub Half Micron Core Width Spin Valve Read Head," 2000 IEEE.
S.H.Liao et al. ,88-04. "A Study onthe Extendability of Spin Valve Heads for High Density Recording".

* cited by examiner

*Primary Examiner*—A. Dexter Tugbang
*Assistant Examiner*—Paul D. Kim
(74) *Attorney, Agent, or Firm*—George O. Saile; Stephen B. Ackerman

(57) ABSTRACT

A major problem in Lead Overlay design for GMR structures is that the magnetic read track width is wider than the physical read track width. This is due to high interfacial resistance between the leads and the GMR layer which is an unavoidable side effect of prior art methods. The present invention uses electroplating preceded by a wet etch to fabricate the leads. This approach requires only a thin protection layer over the GMR layer to ensure that interface resistance is minimal. Using wet surface cleaning avoids sputtering defects and plating is compatible with this so the cleaned surface is preserved Only a single lithography step is needed to define the track since there is no re-deposition involved.

20 Claims, 5 Drawing Sheets

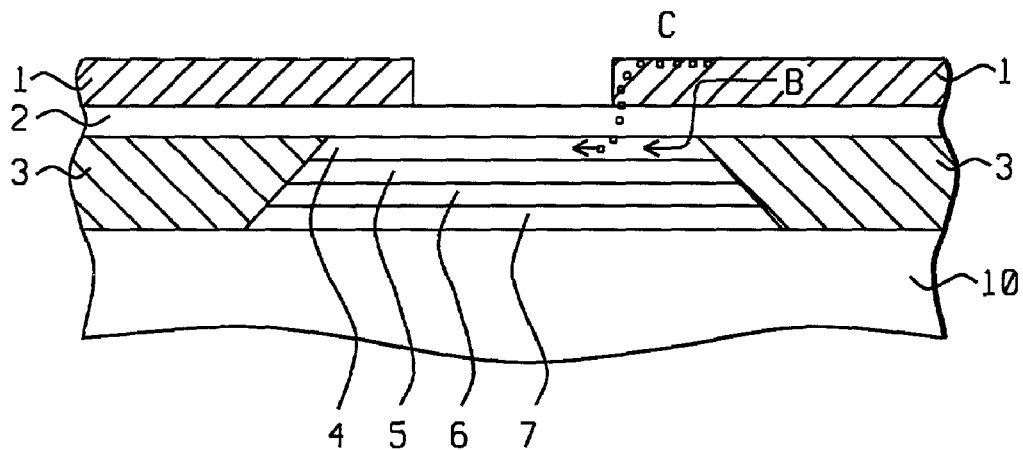
FIG. 1 – Prior Art
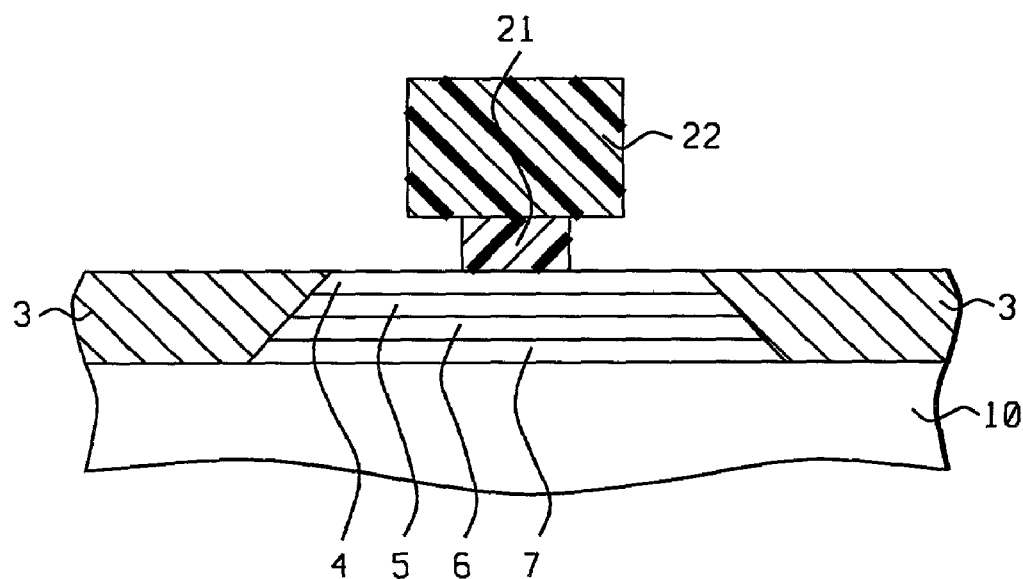
FIG. 2A – Prior Art

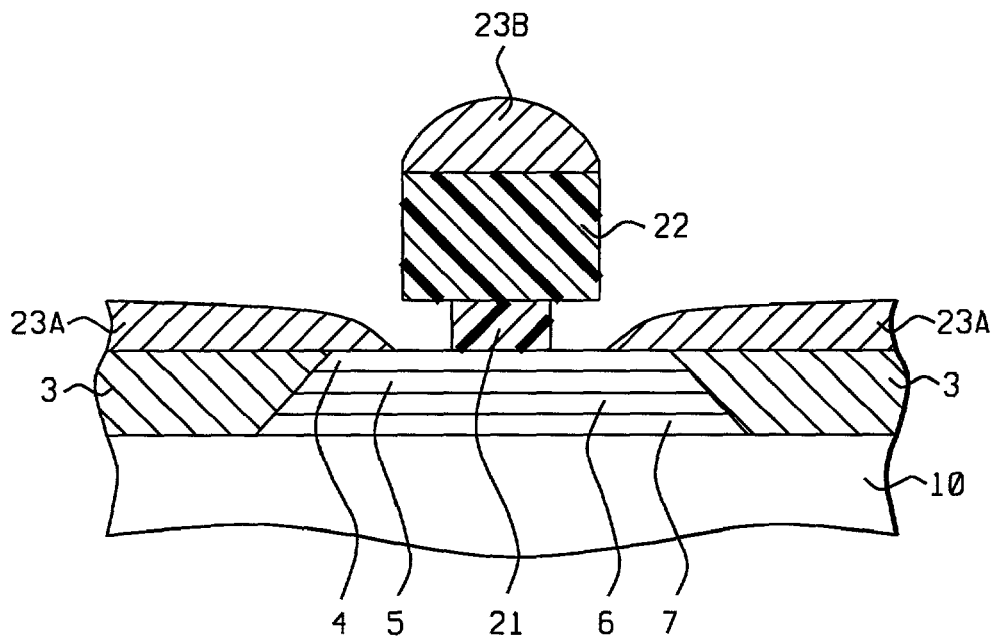
FIG. 2B – Prior Art
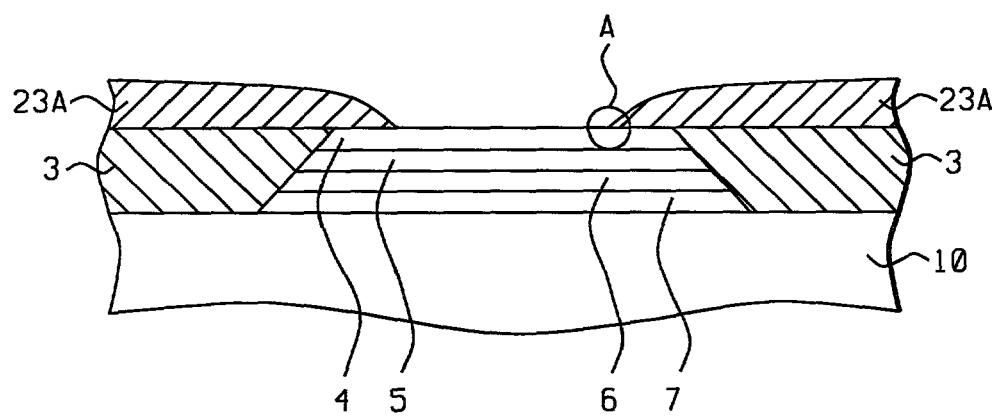
FIG. 2C – Prior Art

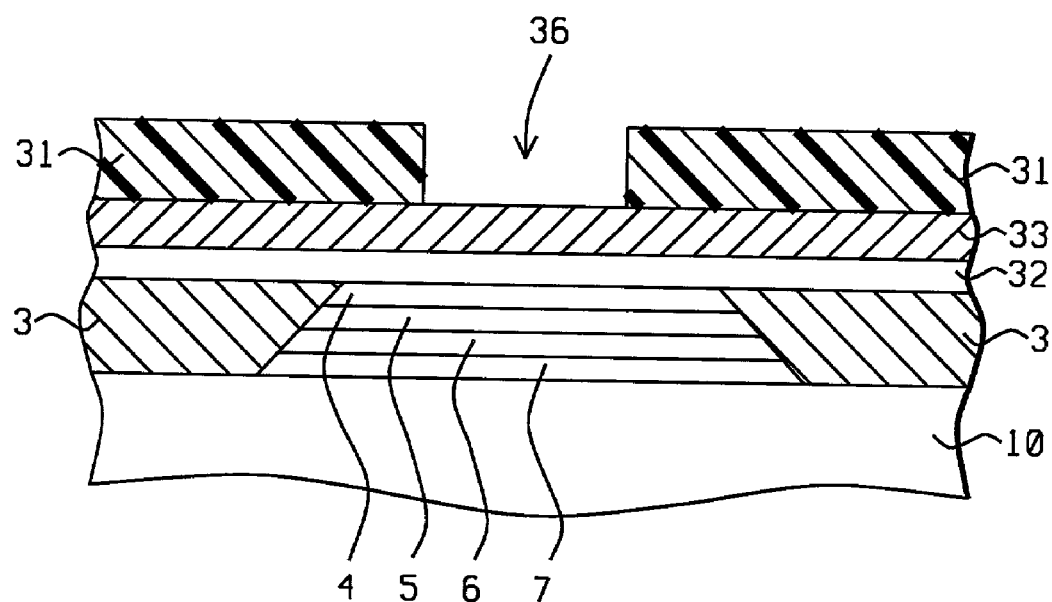
FIG. 3A – Prior Art
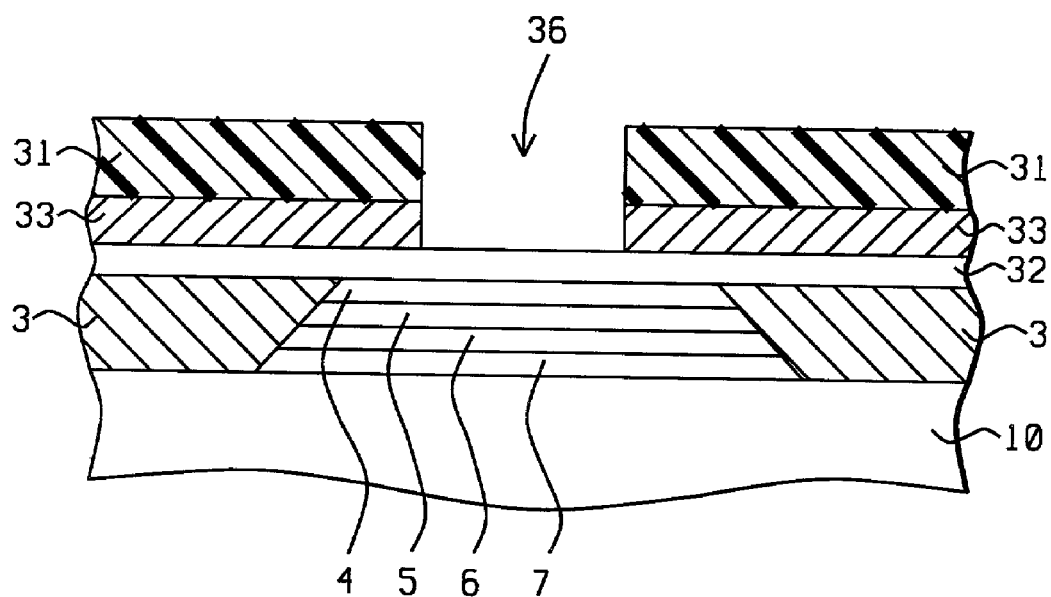
FIG. 3B – Prior Art

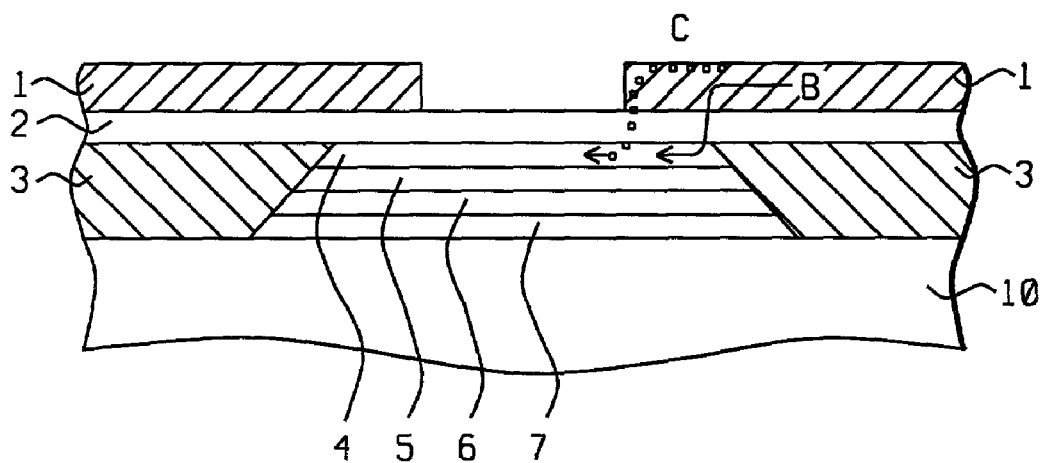
*FIG. 3C - Prior Art*
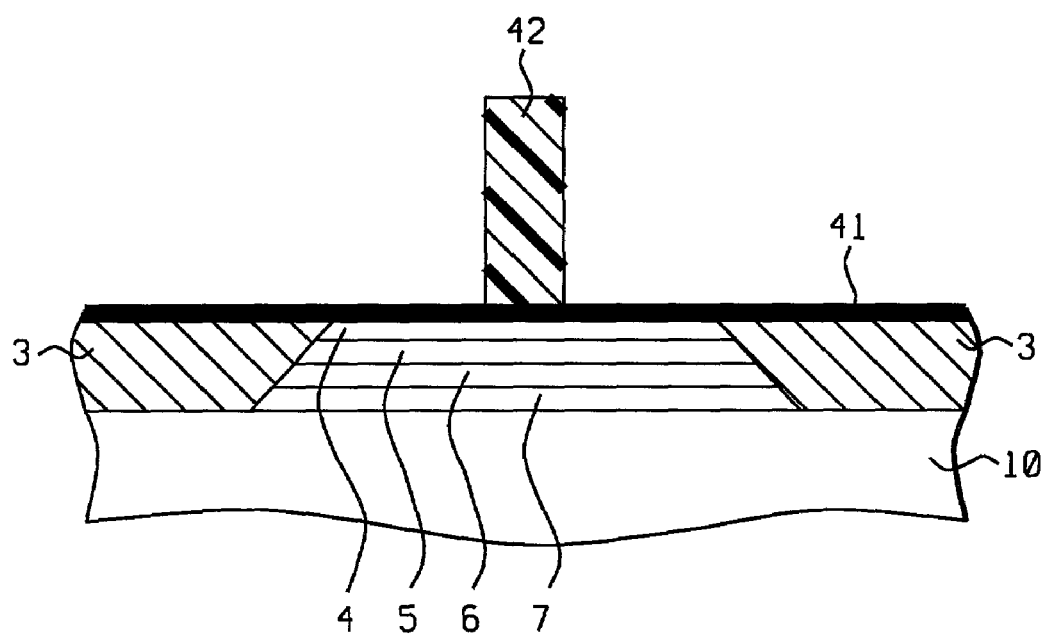
*FIG. 4A*

LEAD PLATING METHOD FOR GMR HEAD MANUFACTURE

FIELD OF THE INVENTION

The invention relates to the general field of magnetic disk storage with particular reference to reading very high track densities

BACKGROUND OF THE INVENTION

The principle governing the operation of the read sensor in a magnetic disk storage device is the change of resistivity of certain materials in the presence of a magnetic field (magneto-resistance). Magneto-resistance can be significantly increased by means of a structure known as a spin valve. The resulting increase (known as Giant magneto-resistance or GMR) derives from the fact that electrons in a magnetized solid are subject to significantly less scattering by the lattice when their own magnetization vectors (due to spin) are parallel (as opposed to anti-parallel) to the direction of magnetization of the solid as a whole.

The key elements of a spin valve structure are shown in FIG. 1. Seen there, on substrate 10, is exchange pinning layer 7, made of PtMn or NiMn and having a thickness of about 100–300 Å. Layer 6 is a pinned layer of CoFe or CoFe/NiFe laminate, having a thickness of 20–200 Å. (for a synthetic spin valve the layer would be CoFe/Ru/CoFe). Layer 5 is a spacer layer of Cu, Au or Ag with a thickness of 5–25 Å while layer 4 is the free layer, of CoFe or CoFe/NiFe laminate (thickness 20–200 Å).

Although layers 4–7 are all that is needed to produce the GMR effect, additional problems remain. In particular, there are certain noise effects associated with such a structure. As first shown by Barkhausen in 1919, magnetization in iron can be irregular because of reversible breaking of magnetic domain walls, leading to the phenomenon of Barkhausen noise. The solution to this problem is to provide operating conditions conducive to single-domain films for MR sensor and to ensure that the domain configuration remains unperturbed after processing and fabrication steps. This is most commonly accomplished by giving the structure a permanent longitudinal bias provided, in this instance, by layer 3 which is a hard bias material such as Cr/CoPt or Cr/CoCrPt (where Cr is 0–200 Å), CoPt or CoCrPt (100–500 Å). Layer 2 is a protection layer of Ta or Ru with a thickness of 1–30 Å.

Of particular interest for the present invention is layer 1 from which the input and output leads to the device are fabricated. An example of a lead material is Ta/Au/Ta, where Ta is 20–100 Å and Au is 100–500 Å. One of the major problem in Lead Overlay (LOL) design is that the magnetic read track width is wider than physical read track width. This is due to high interfacial resistance between the lead and the GMR layer if integration is done with conventional metallurgy. This is symbolized in FIG. 1 by current flow along path B instead of along the ideal path C.

In FIG. 2A we illustrate the first of two prior art methods that have been used to form the leads. With layers 3 through 7 in place, a lift-off mask is formed. This comprises two layers 21 and 22. Both layers are light sensitive and therefore patternable in the usual way. Top layer 22 is conventional photoresist but lower layer 21 is a material that is readily etched away. Consequently, when a layer is laid down over this structure, as shown in FIG. 2B, part of this layer (23A) deposits onto the spin valve top surface and part of it (23B) deposits onto upper pattern 22. Then when a solvent to remove part 21 is applied, the latter soon dissolves and part 22, including layer 23B, lifts off and is removed, leaving behind two leads separated by the original width of 22, as shown in FIG. 2C.

The problem with this approach is that there is a degradation of electrical conductance at the tip of the lead arising from the resist shadowing leading to poor track width definition for extremely narrow track widths. Area "A" marked in FIG. 2C indicates the area of poor track width definition and lowered electrical conductance area.

An improved fabrication process has been reported by Tanaka et al. and is illustrated in FIG. 3A. A dry etch is used to define the separation between the leads (track width 36). However, this approach also results in wider magnetic read width than physical read width because a relatively thick etch stop layer 32 is required in this approach to properly define leads 33 without etching into the GMR sensor. This etch stop layer generally consists of slow dry etch materials such as Ta, Cr, W, Ti, or their alloys. These materials are often high in electrical resistivity and the resulting high interface resistance prevents the electrical current from flowing into the very edge of the lead—the current flow path that is obtained is the one marked as B in FIG. 3C. The ideal current flow path is marked by G in the FIG. 3C.

The present invention discloses a process to manufacture a structure that allows current flow through path C, This results in much smaller magnetic/physical read track width difference.

A routine search of the prior art was performed with the following references of interest being found:

In U.S. Pat. No. 6,188,495, Wiitala describes a lead process for a SV MR. In U.S. Pat. No. 6,118,621, Ohsawa also show a lead process. (Shouji et al. discloses MR heads with different shaped leads in U.S. Pat. No. 5,907,459 while in U.S. Pat. No. 5,761,013, Lee et al. discuss leads and routing.

SUMMARY OF THE INVENTION

It has been an object of at least one embodiment of the present invention to provide a process for the formation of leads to a spin valve structure.

Another object of at least one embodiment of the present invention has been that said leads have a controlled gap less than about 0.15 microns.

Still another object of at least one embodiment of the present invention has been that said leads have minimal interface resistance to the device so that current flows into the device right before the gap, resulting in a precise magnetic (as opposed to physical) track width.

These objects have been achieved by using electroplating preceded by a wet etch to fabricate the leads. This approach requires only a thin protection layer over the GMR layer to ensure that interface resistance is minimal. Using wet surface cleaning avoids sputtering defects and plating is compatible with this so the cleaned surface is preserved Only a single lithography step is needed to define the track since there is no re-deposition involved.

BRIEF DESCRIPTION OF THE DRAWINGS

FIG. 1 illustrates why devices of the prior art exhibit greater magnetic track widths than physical track widths.

FIGS. 2A–2C show a prior art process for forming the read gap, based on sputter deposition and liftoff.

FIGS. 3A–3C show a prior art process for forming the read gap, based on use of an etch stop layer.

FIGS. 4A–4C illustrate the process of the present invention which is based on use of electrodeposition.

DESCRIPTION OF THE PREFERRED EMBODIMENTS

The process of the present invention starts as illustrated in FIG. 4A. Prior provision of a spin valve structure of the type discussed above is assumed. This includes layers 3 through 7 as shown in FIG. 4A. Additionally, there is a protective layer 41 on the top surfaces of both layers 3 and 4, which layers have been planarized so that their topmost surfaces are coplanar. Layer 41 is typically about 1–30 Angstroms thick and is made of tantalum or ruthenium. Layer 41 will also serve as a seed layer for the electroplating step that occurs later in the process.

A layer of a patternable resist material is then deposited onto protective layer 41. This resist material may be sensitive to either deep ultraviolet (UV), which we will define here as radiation in the wavelength range of from 1,930 to 2,480 Angstroms or to electron beam radiation. The resist is deposited to a thickness between about 0.5 and 1 microns. After exposure to (and development of) a suitable pattern of the selected radiation, a pedestal 42 of resist remains and is located midway between the two biased layers 3, as illustrated in FIG. 4A.

Wet surface cleaning all of all exposed surfaces is now performed. This step is highly dependent on the surface condition of the GMR sensor. The goal of this step is to remove organic contamination and reduce surface oxide so that uniform electroplating and minimal interface resistance can be achieved. A typical 1–10% $H_2:N_2$ plasma ashing using 50–300 W for up to 60 seconds removes resist residue and organic contamination without inducing further surface oxide formation.

An optional surface activation step may be introduced at this point. For surfaces that can be activated by acid, a brief dip in the plating solution itself or in 1–10% HCl, $H_2SO_4$, or $HNO_3$ for 1–120 sec. is sufficient to improve adhesion.

Figure 4B:
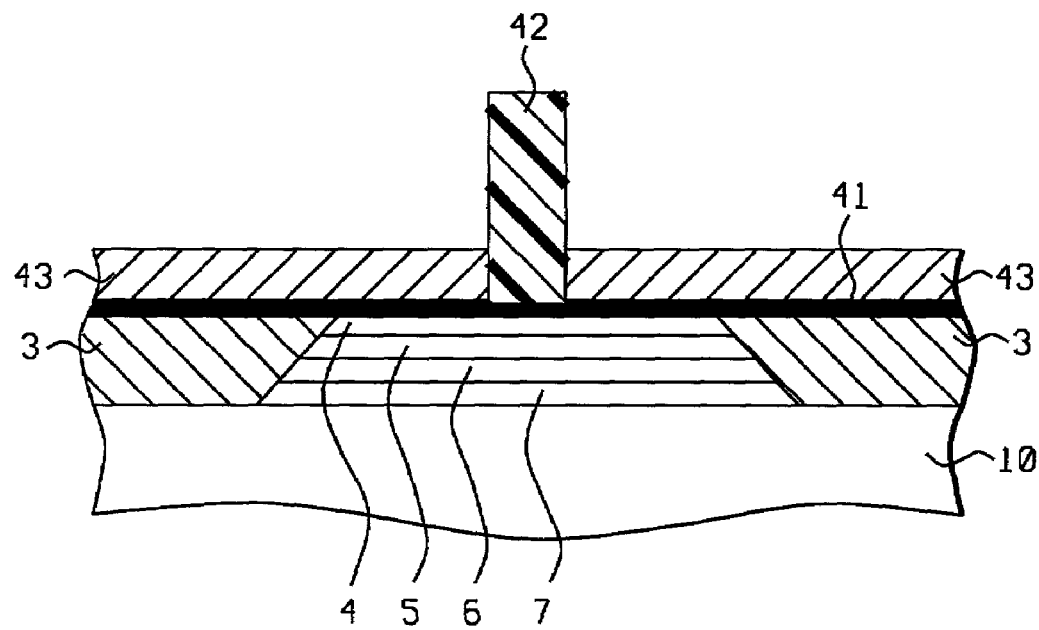

This is followed by a key feature of the invention, namely the laying down of the lead layer. This is done by immersing the freshly cleaned protective layer 41 in a plating solution, having a pH between about 1 and 9, and then electroplating onto it metal layer 43, for between about 1 and 120 seconds, as seen in FIG. 4B. The lead material of choice requires low electrical resistivity (between about 2 and 10 microohm-cm). The most commonly used is gold but other platable low resistivity materials such as Cu, Ag, Ni, Co, Rh, Ir, Mo or their alloys could also have been used. The thickness of this layer is between about 100 and 1,000 Angstroms.

Gold plating can be done from commercial bright sulfite-based gold plating solution. Typical gold plating parameters are: Gold: 5–15 g/L and Sodium Sulfite: 45–55 g/L at a pH between 6.0–7.0. Plating is performed in a temperature range of 15–80° C. at a current density of 1–20 $mA/cm^2$, with 5 $mA/cm^2$ being preferred. Agitation level during plating is mild.

Figure 4C:
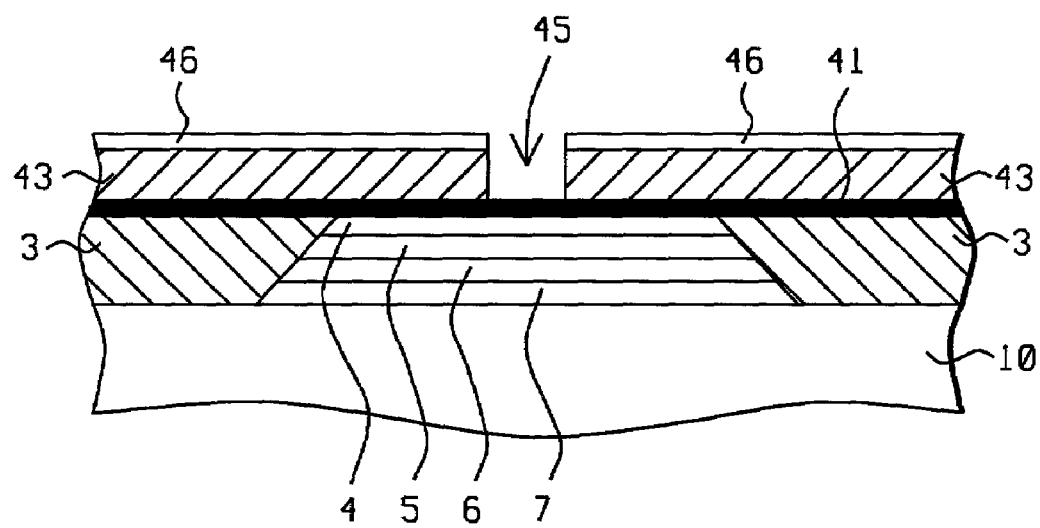

Once electrodeposition has been completed (followed by rinsing in deionized water and blow drying), resist pedestal 42 is immediately removed which results in the formation of a pair of leads 43, separated by a gap 45, as seen in FIG. 4C. Gap 45 has a width between about 0.1 and 0.5 microns. Removal of resist pedestal 42 was achieved by immersion in a solution of N-methyl 2-pyrrolidone at about 80° C.

The process concludes with the deposition of capping layer 46. A capping layer may be needed to improve adhesion of the lead material at the read gap. It can also reduce smearing during wafer lapping processes. The choice of capping layer includes Ta, W, Cr, TiW, and Ti. These materials have good adhesion among layers and they are relatively high in electrical resistivity. The thickness is up to 100 Angstroms. Common sputter deposition is adequate for this application.

What is claimed is:

1. A process for forming leads to a magnetic read head, comprising:

providing a spin valve structure having two opposing sloping sides on each of which is a layer of longitudinally biased magnetic material, said biased material and said spin valve having coplanar topmost surfaces on which is a protective layer;

depositing a layer of a resist sensitive to deep UV on said protective layer;

exposing said resist layer to a deep UV pattern whereby, after development, a pedestal of said resist remains midway between said biased layers;

wet surface cleaning all of said protective layer not covered by said pedestal;

immersing said protective layer in a plating solution and then electroplating onto said protective layer a layer of a metal;

removing said resist pedestal, thereby forming a pair of leads separated by a gap; and depositing a capping layer on said pair of leads.

2. The process described in claim 1 wherein said UV sensitive resist is deposited to a thickness between about 0.5 and 1 microns.

3. The process described in claim 1 wherein said plating solution is composed of:

5–15 g/L of gold in an aqueous solution containing 45–55 g/L of sodium sulfite.

4. The process described in claim 1 wherein said gap has a width between about 0.1 and 0.5 microns.

5. The process described in claim 1 further comprising performing said step of electroplating at a current density between about 1 and 20 $mA/cm^2$.

6. The process described in claim 1 wherein said electroplating step is performed for between about 1 and 120 seconds whereby said metal layer has a thickness between about 100 and 1,000 Angstroms.

7. The process described in claim 1 wherein said metal is selected from the group consisting of copper, silver, nickel, cobalt, rhodium, iridium, molybdenum, and their alloys.

8. The process described in claim 1 wherein said metal has a resistivity between about 2 and 10 microohm-cm.

9. The process described in claim 1 wherein said electroplating step is performed at a temperature between about 10 and 60° C.

10. The process described in claim 1 wherein said electroplating solution has a pH between about 1 and 9.

11. A process for forming leads to a magnetic read head, comprising:

providing a spin valve structure having two opposing sloping sides on each of which is a layer of longitudinally biased magnetic material, said biased material and said spin valve having coplanar topmost surfaces on which is a protective layer;

depositing a layer of a resist sensitive to an electron beam on said topmost surfaces;

exposing said resist layer to a pattern mapped out by an electron beam whereby, after development, a pedestal of said resist remains midway between said biased layers;

wet surface cleaning all of said protective layer not covered by said pedestal;

immersing said protective layer in a plating solution and then electroplating onto said protective layer a layer of a metal;

removing said resist pedestal, thereby forming a pair of leads separated by a gap; and depositing a capping layer on said pair of leads.

12. The process described in claim 11 wherein said UV sensitive resist is deposited to a thickness between about 0.5 and 1 microns.

13. The process described in claim 11 wherein said plating solution is composed of:

5–15 g/L of gold in an aqueous solution containing 45–55 g/L of sodium sulfite.

14. The process described in claim 11 wherein said gap has a width between about 0.1 and 0.5 microns.

15. The process described in claim 11 further comprising performing said step of electroplating at a current density between about 1 and 20 mA/cm$^2$.

16. The process described in claim 11 wherein said electroplating step is performed for between about 1 and 120 seconds whereby said metal layer has a thickness between about 100 and 1,000 Angstroms.

17. The process described in claim 11 wherein said metal is selected from the group consisting of copper, silver, nickel, cobalt, rhodium, iridium, molybdenum, and their alloys.

18. The process described in claim 11 wherein said metal has a resistivity between about 2 and 10 microohm-cm.

19. The process described in claim 11 wherein said electroplating step is performed at a temperature between about 10 and 60° C.

This is followed by a key feature of the invention, namely the laying down of the lead layer. This is done by immersing the freshly cleaned protective layer 41 in a plating solution and then electroplating onto it metal layer 43, as seen in FIG. 4B. The lead material of choice requires low electrical resistivity (between about 2 and 10 micr ohm-cm). The most commonly used is gold but other platable low resistivity materials such as Cu, Ag, Ni, Co, Rh, Ir, Mo or their alloys could also have been used. The thickness of this layer is up to 500 Angstroms.

20. The process described in claim 11 wherein said electroplating solution has a pH between about 1 and 9.

* * * * *